United States Patent
Azami et al.

(10) Patent No.: US 7,436,534 B2
(45) Date of Patent: Oct. 14, 2008

(54) PRINTER, AN OPERATION PANEL THEREOF HAVING A FUNCTION FOR DOING MAINTENANCE OF PRINT STATION

(75) Inventors: Osamu Azami, Nagano-ken (JP); Masayasu Iwanami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 977 days.

(21) Appl. No.: 10/419,273

(22) Filed: Apr. 21, 2003

(65) Prior Publication Data

US 2004/0046984 A1  Mar. 11, 2004

(30) Foreign Application Priority Data

Apr. 19, 2002  (JP)  ............... 2002-117191

(51) Int. Cl.
*G06F 15/00* (2006.01)
*G06K 1/00* (2006.01)
(52) U.S. Cl. ..................... 358/1.15; 358/1.13
(58) Field of Classification Search ........... 358/504, 358/406, 1.1, 1.9, 1.11–1.13, 1.14, 1.15, 358/1.16, 1.17, 1.18; 710/6, 18; 709/203, 709/217
See application file for complete search history.

(56) References Cited

U.S. PATENT DOCUMENTS 5,467,434 A * 11/1995 Hower et al. ............... 358/1.15
5,978,559 A * 11/1999 Quinion .................... 358/1.15
6,732,195 B1 * 5/2004 Baldwin ...................... 710/6
2002/0097425 A1 * 7/2002 Owen et al. ................ 358/1.15
2003/0069921 A1 * 4/2003 Lamming et al. .......... 709/203

FOREIGN PATENT DOCUMENTS

JP  6-234258  8/1994
JP  2000-347829  12/2000

* cited by examiner

*Primary Examiner*—Dov Popovici
*Assistant Examiner*—Thierry L Pham
(74) *Attorney, Agent, or Firm*—Sughrue Mion, PLLC

(57) ABSTRACT

A model-specific database 27 provided on a print control member 11 of a printer stores setting commands for a plurality of print stations, and menu information to be displayed on an operation panel. A maintenance processing member 25 obtains from the model-specific database 27, a menu corresponding to the model ID 251 of the print station, and displays the menu on the operation panel exposed at the printer housing. A maintenance operator carries out adjustment of the print station by operating the operation panel. Since processes and the like depending on the model of the print station are concentrated in the maintenance processing member 25 and the model-specific database 27, other structures of the print control member 11 can be configured so as not to depend on the model of the print station.

3 Claims, 4 Drawing Sheets

27

| MODEL | ITEM COLOR MATCHING 1 COLOR MATCHING 2 | SET VALUE | COMMAND | REBOOT NECESSARY UNNECESSARY |
|---|---|---|---|---|
| A1 |  | 1,2,3,4,5 | 01 |  |
| A1 |  | −10~10 | 02 |  |
| ⋮ | ⋮ | ⋮ | ⋮ | ⋮ |

50

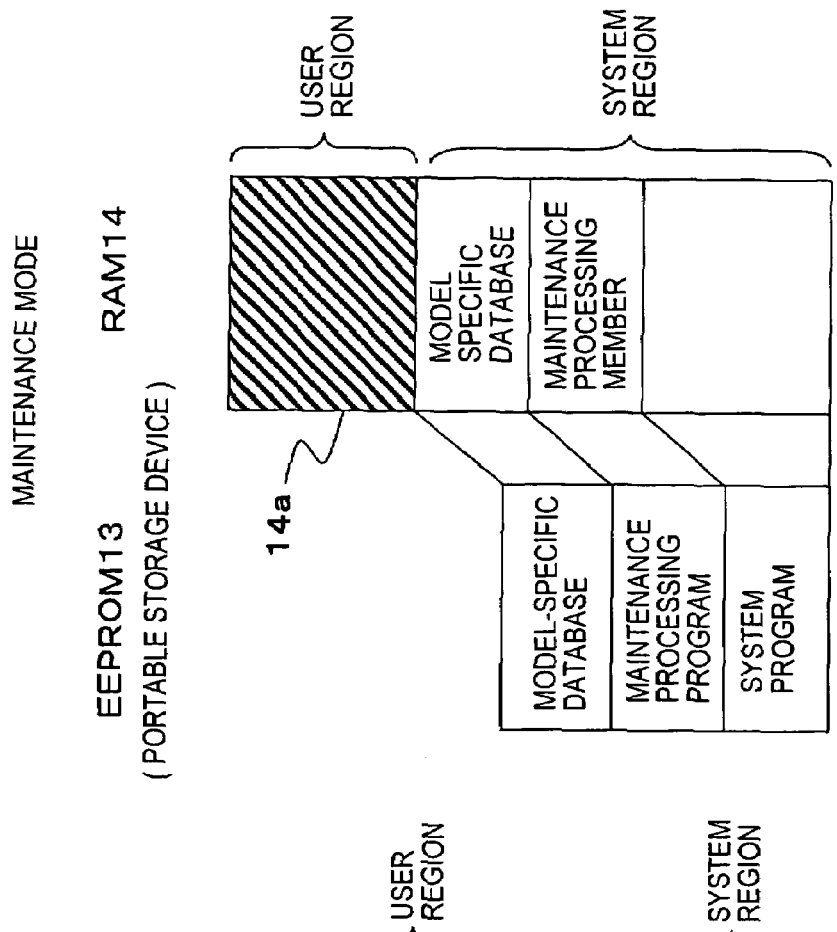

PRINTER, AN OPERATION PANEL THEREOF HAVING A FUNCTION FOR DOING MAINTENANCE OF PRINT STATION

BACKGROUND OF THE INVENTION

A printer is equipped with a print station which comprises a print head, a sheet feed mechanism, and the like, for actually carrying out printing. This print station receives a predetermined command forwarded from the outside. Settings of this print station are changed according to thus received command, and a finished print condition is adjusted.

Typically, the command for changing the print station settings is not disclosed to a general user. Therefore, the above adjusting work is carried out by a maintenance operator belonging to a printer manufacturer and the like, by connecting a computer installed with dedicated software with the printer.

SUMMARY OF THE INVENTION

According to the above situation, for carrying out an adjustment of the print station, it has been necessary for the maintenance operator to bring with him/her, a computer installed with the dedicated software. Alternatively, before the adjustment, such dedicated software had to be installed in advance on a host computer that is originally connected to the printer. For the maintenance operator, it is inconvenient to carry the computer, and to install the dedicated software on the computer. In this connection, if such an adjusting work can be carried out from an operation panel provided on a printer, it may be convenient.

Generally, a setting command to the print station varies according to a model of the print station. Therefore, for maintenance, plural pieces of dedicated software should have been developed, respectively, to a plurality of print station models. Furthermore, in the case where the adjusting works are carried out from the operation panel, it is necessary to incorporate, in a control program and the like of the operation panel, an individual processing according to the print station model.

A printer in accordance with one aspect of the present invention comprises a print station, a control member for controlling the print station, and an operation panel exposed to outside. Furthermore, the printer comprises a menu storing member for storing menu information which is undisclosed to a user for carrying out a setting of the print station, and a menu processing member for displaying the menu information stored in the menu storing member and for receiving an input to the operation panel, during a maintenance mode. Furthermore, the control member carries out setting of the print station, based on the input received by the menu processing member.

In a preferred embodiment, the menu processing member further comprises a panel control member for controlling input/output to/from the operation panel, and a menu managing member for referring to the menu storing member, and managing the menu to be displayed on the operation panel. The printer further comprises a generating information storage member for storing information that is necessary for generating the menu managing member, and when the printer is started in a maintenance mode, the menu managing member is generated based on the information stored in the generating information storage member.

In a preferred embodiment, the menu storing member stores menu information for print stations of a plurality of models, and the menu processing member displays on the operation panel the menu information corresponding to a model of the print station.

In a preferred embodiment, the menu storing member stores a menu item and a command to the print station in associated manner with each other. The menu processing member displays the menu items on the operation panel and receives a selection of the menu item thus displayed. The control member transmits a command corresponding to the menu item thus selected to the print station, and carries out setting of the print station.

A printer in accordance with another aspect of the present invention comprises a print station, a control member for controlling the print station and an operation panel exposed to outside, further comprising a panel control member for controlling input/output to/from the operation panel, a connecting member for connecting a portable storage device, and a portable storage device control member for generating the menu managing member which displays the menu information on the operation panel and receives an input to the operation panel by referring to the portable storage device, when menu information which is undisclosed to a user for carrying out setting of the print station, and information for generating the menu managing member, are stored in the portable storage device that is connected to the connecting member. Then, the control member carries out setting of the print station, based on the input that the menu managing member has received.

In a preferred embodiment, the printer further comprises a storage device, and the menu managing member is generated on the storage device.

In a preferred embodiment, the printer further comprises a storage device, and the menu information is expanded on the storage device.

In a preferred embodiment, when the printer is started in a maintenance mode, the portable storage device control member refers to the portable storage device and generates the menu managing member.

The portable storage device which is connectable to a printer in accordance with one aspect of the present invention, stores menu information which is undisclosed to a user for carrying out setting of the print station of the printer, and information for generating within the printer, the menu managing member for displaying the menu information on the operation panel and for receiving an input to the operation panel.

BRIEF DESCRIPTION OF THE DRAWINGS

FIGS. 6(A) and (B) are an illustration comparing a busy condition of RAM between in a normal mode and in a maintenance mode.

DETAILED DESCRIPTION OF THE INVENTION

Hereinafter, a printer relating to the embodiment to which the present invention is applied will be explained, with reference to the attached drawings. According to the printer of the present embodiment, it is possible for a maintenance operator, belonging to a printer manufacturer and the like, to make an adjustment of a print station by use of an operation panel provided on the printer.

Figure 1:
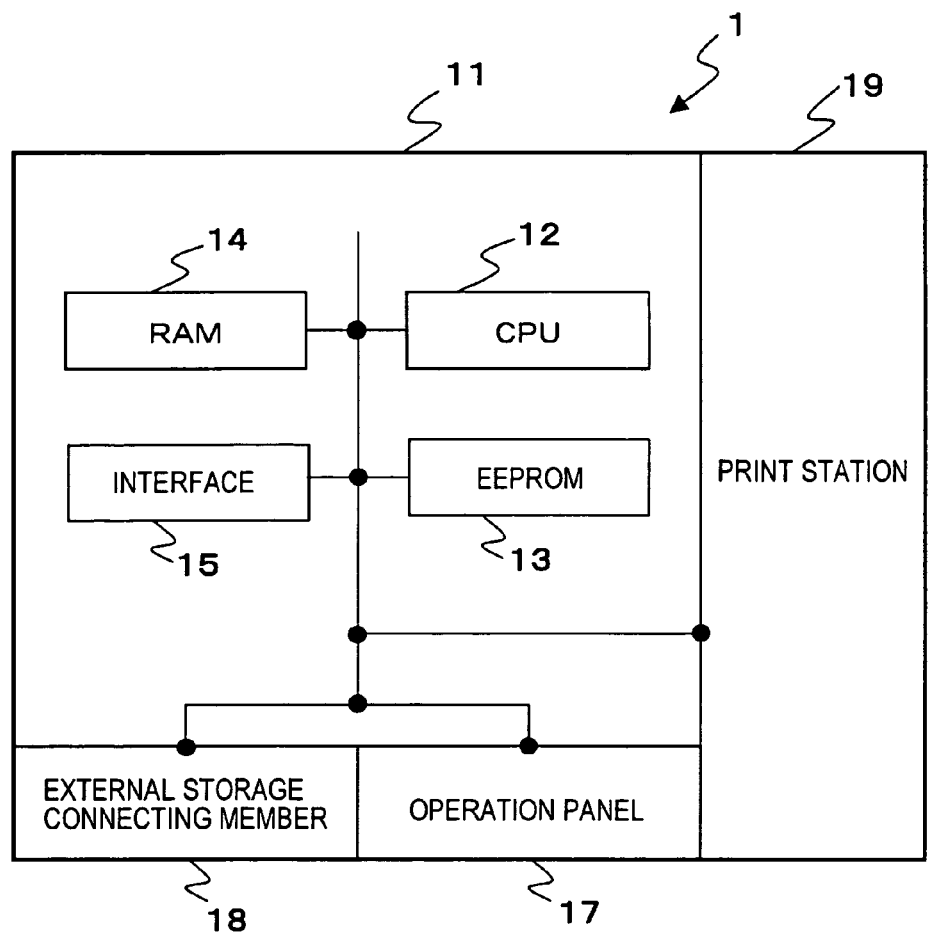
FIG. 1 is an illustration showing a hardware configuration of the printer relating to one embodiment of the present invention.

FIG. 1 is a figure of hardware configuration of a printer 1 relating to the present embodiment. The printer 1 is, for example, an inkjet printer capable of color printing. When the printer receives print data from a host device, not illustrated, a predetermined print process is executed, and image is formed on printing paper which is printing media. This printer 1 comprises a print station 19 and a print control member 11 for controlling the print station. The print station 19 comprises a print head, a sheet feed mechanism, a control circuit to control them, and the like, and actually executes printing. The print control member 11 comprises a CPU (Central Processing Unit) 12 for executing various programs and the like, an EEPROM (Electrically Erasable Programmable Read-Only Memory) 13 that stores various data and various programs, a RAM (Random Access Memory) 14 which stores various data and various programs temporarily, an interface 15 for carrying out data receiving and transmitting with a host device that is not illustrated, an operation panel 17 serving as an interface with a user, and an external storage connecting member 18 to connect an external storage device.

Figure 2:
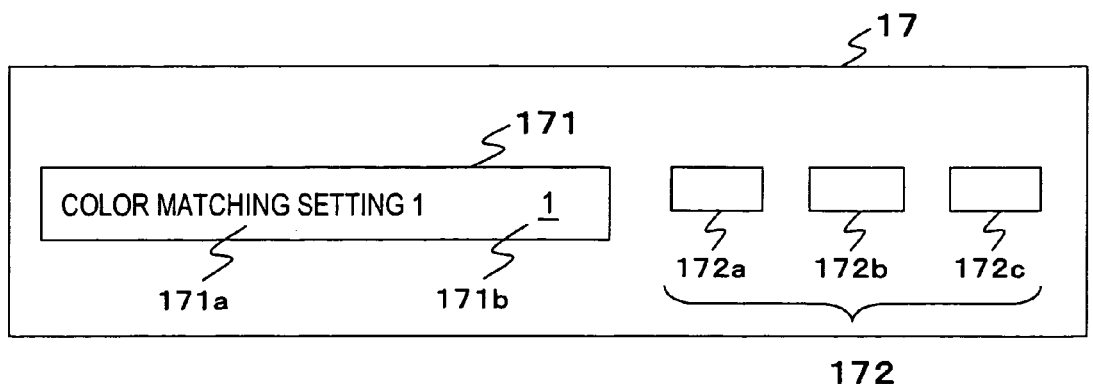
FIG. 2 is an illustration showing one example of an appearance of the operation panel.

The operation panel 17 is exposed at a housing (not illustrated) of the printer 1, and it offers various information to the user as well as receiving a command input from the user. As shown in FIG. 2, for example, the operation panel 17 comprises a display member 171 for displaying characters, graphics and the like, and an operation member 172 for receiving a user input operation. The display member 171 can be implemented by use of a liquid crystal panel or an organic EL (Electroluminescence) device. The operation member 172 comprises operation buttons 172 (172a to 172c). Relations between an operation received by the operation member 172 and information displayed on the display member 171 will be described below.

Onto the external storage connecting member 18, it is possible to connect a portable storage device such as a memory card attachably and detachably.

Figure 3:
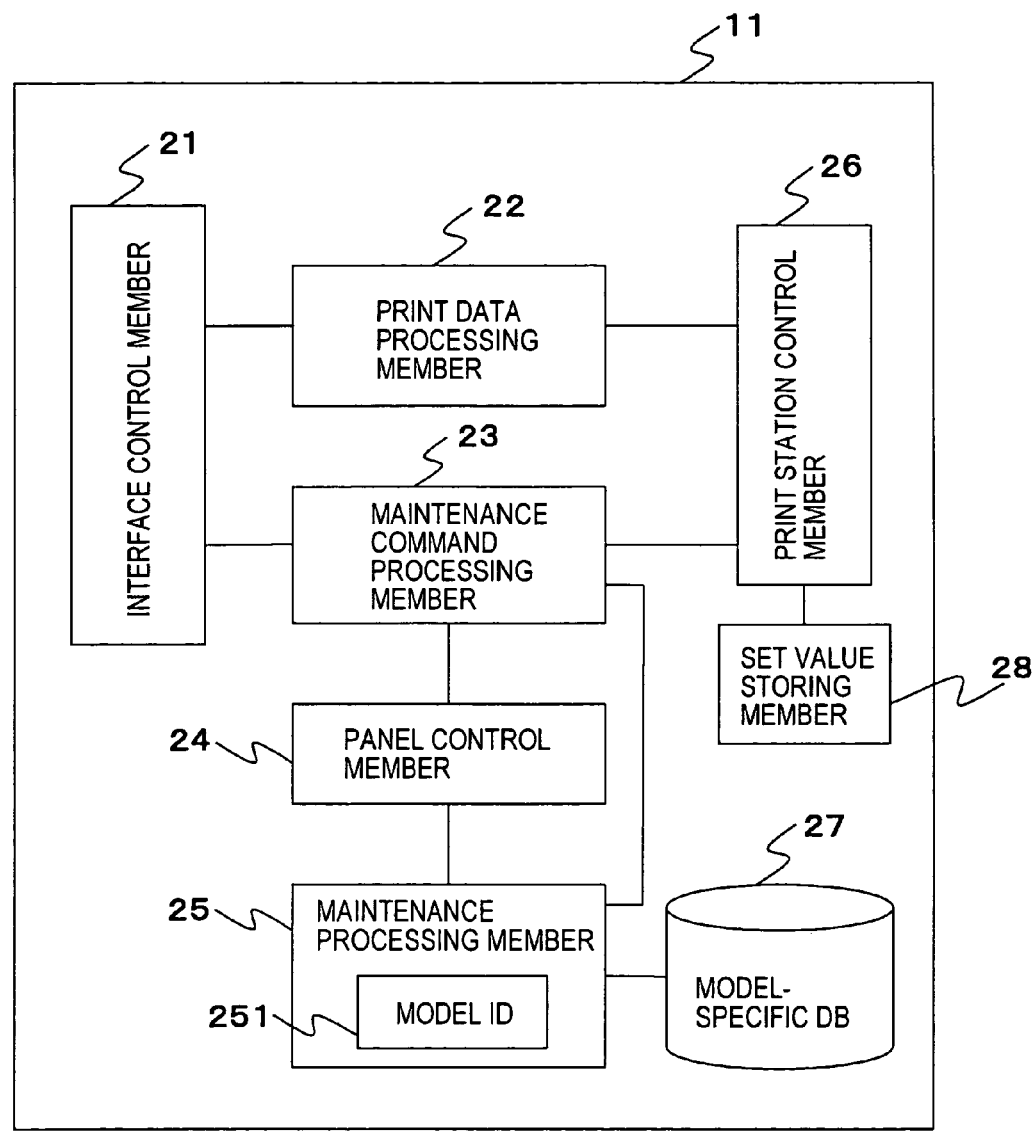
FIG. 3 is a functional block diagram of the print control member.

Next, an internal function of the print control member 11 will be explained with reference to the functional block diagram as shown in FIG. 3. Each function of the print control member 11, which will be explained below, can be implemented by the CPU 12 that reads and executes a predetermined program, which is stored in the EEPROM 13 or in the portable external storage device that is connected to the external storage connecting member 18. In particular, details as to generation of the maintenance processing member 25 will be explained below.

The print control member 11 comprises an interface control member 21, a print data processing member 22 for interpreting the print data and notifying the print station control member of the data thus interpreted, a maintenance command processing member 23, a panel control member 24, a print station maintenance processing member 25, a print station control member 26, and a model-specific database 27.

The interface control member 21 controls data transmission and data receipt with the host device, which is not illustrated. For example, the interface control member 21 receives print data from the host device.

At first, the print data processing member 22 obtains the print data that the interface control member 21 has received. Here, the print data is represented, for example, by a page description language or printer control command and the like. Then, the print data processing member 22 interprets this print data, and executes a process for converting the print data to a command for controlling the print station. The print station control member 26 is notified of the command obtained by the above conversion.

The maintenance command processing member 23 interprets a maintenance command of the print station and notifies the print station control member 26 of a setting command according to the maintenance command. More details of the maintenance command will be described below.

Based on a process result that is obtained from the print data processing member 22 after processing the print data, the print station control member 26 controls the print station 19 to execute printing. Furthermore, in order to carry out an adjustment of the print station 19, the print station control member 26 receives a setting command of the print station, and based on this setting command, settings of the print station 19 are changed. In addition, when the setting command of the print station is received, it may be possible to store a set value included in the setting command, in a set value storing member 28 configured in the EEPROM 13. In this case, every time the printer 1 is started up, the print station control member 26 refers to the set value stored in the set value storing member 28, and settings of the print station 19 are carried out based on the set value.

A panel control member 24 controls input/output of the operation panel. For example, the panel control member 24 allows the display member 171 to display information notified from the maintenance processing member 25, and receives an operational input to the operation member 172.

Figures 4, 5:
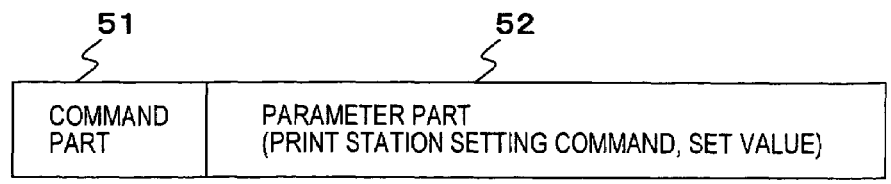
FIG. 4 is an illustration showing one example of data structure of a model-specific database.
FIG. 5 is an illustration showing one example of data format of a maintenance command.

The model-specific database 27 stores by print station model, setting commands of print stations of a plurality of models, menu information to be displayed on the operation panel, and the like. For example, as shown in FIG. 4, the model-specific database 27 comprises, as data items, a model ID 271 for identifying the model of the print station, a menu item 272, a set value 273 for the menu item, a setting command 274 of the print station, and a reboot necessity indicator 275. The menu item 272 is menu information to be displayed on the operation panel 17. The set value 273 indicates a value that can be employed as a setting of the menu item 272. The setting command 274 is a command associated with the menu item 272. The reboot necessity indicator 275 indicates whether or not rebooting is necessary after the change in settings of the print station is made, so as to make the change in settings effective.

The maintenance processing member 25 manages a menu to be used for change in settings of the print station, and executes a processing such as setting change. For example, when the printer 1 is started in a maintenance mode, the maintenance processing member 25 allows the operation panel 17 via the panel control member 24 to display the menu item 272 and the set value 273 that are stored in the model-specific database 27, and allows a maintenance operator to make a selection. Operations and the like that the operation panel 17 may receive will be described below. Based on the menu item 272 and the set value 273 selected here, the maintenance processing member 25 generates a maintenance command and notifies the maintenance command processing member 23 of the command. An example of data format of this maintenance command is shown in FIG. 5.

The maintenance command 50 comprises a command part 51 and a parameter part 52. The command part 51 corresponds to a command to the maintenance command processing member 23. The parameter part 52 includes a setting command 274 corresponding to a selected menu item 272, and a selected set value 273.

Since the setting command 274 varies according to the model of the print station 19, the maintenance processing member 25 holds a model ID 251 of the print station 19, which is mounted on the printer 1. Then, the maintenance processing member 25 obtains from the model-specific database 27, a record with a model ID 271 matching the model ID 251.

With this configuration, by registering as a model ID 251, a model ID of the print station 19, which is mounted on the printer 1, the maintenance processing member 25 and the model-specific database 27, can handle print stations of a plurality of models. In other words, commands and processes and the like peculiar to one specific print station model can be handled by a process by the maintenance processing member 25 and the model-specific database 27, and other configurations can be implemented without depending on the print station model.

Hereinafter, a processing procedure and an operational procedure of the maintenance operator, when the printer 1 is started in a maintenance mode, will be explained.

Firstly, when a predetermined particular operation is carried out, upon power-up, the printer 1 is started in a maintenance mode.

When the printer 1 is started in a maintenance mode, the maintenance processing member 25 obtains from the model-specific database 27, a record whose model ID 271 matches the model ID 251. If a plurality of records having the matching model ID exists, such records are all obtained. Then, the maintenance processing member 25 passes the menu item 272 and the set value 273 of thus obtained record to the panel control member 24.

When the panel control member 24 obtains a plurality of menu items 272, one item 272 of the first record is displayed on the display member 171, for example, in accordance with the sequence by which the records are stored in the model-specific database 27. In addition, if the set value 263 corresponding to thus displayed menu item 272 includes a plurality of values possible to be set, the first set value is displayed on the display member 171 in accordance with the sequence by which the set values are recorded within the record. FIG. 2 shows a display example of the operation panel in the case above. In other words, the item 272 of the first record is the item 171a, and the first set value is the set value 171b.

When the maintenance operator operates the operation buttons 172a to 172c of the operation member 172, the panel control member 24 receives this operation, and carries out a process according to the operation. In other words, when the operation button 172a is pressed, the panel control member 24 switches the item 171a and the set value 171b, to the next record item 272 and the first value of the set value 273. Furthermore, when the operation button 172b is pressed, the panel control member 24 switches the set value 171b to a next setting available value. When the operation button 172c is pressed, the item 171a and set value 171b displayed on the display part 171 are selected. Then, the panel control member 24 notifies the maintenance processing member 25 of the selected item and set value.

The maintenance processing member 25 generates a maintenance command 50 as shown in FIG. 5, based on the command 274 corresponding to the selected menu item 272, and the selected set value 273. Then, the maintenance processing member 25 notifies the maintenance command processing member 23 of the maintenance command 50. Furthermore, a setting command of the print station is transmitted from the maintenance command processing member 23 to the print station control member 26, so as to change the settings of the print station.

When the maintenance processing member 25 receives a notification indicating that the setting of the print station has been completed, and then decides whether or not the printer 1 should be rebooted based on the reboot necessity indicator 275, associated with the selected menu item 272. In other words, when the reboot necessity indicator 275 indicates "necessary", a signal to reboot the printer 1 is generated.

Accordingly, with an operation from the operation panel of the printer, settings of the print station can be changed and the print station can be adjusted.

It may also be possible to generate the maintenance processing member 25 as described in the above embodiment, only when the printer 1 is started in a maintenance mode. For example, in the EEPROM 13, a program and data of the model-specific database 27, and a maintenance processing program are stored. When the printer 1 is started in a maintenance mode, the maintenance processing program stored in the EEPROM 13 is expanded in the RAM 14, and the maintenance processing member 25 is generated. Accordingly, in a normal mode, which is not the maintenance mode, it is possible to save a capacity of the RAM 14.

Busy condition of the RAM 14 in this case is illustrated, for example, as shown in FIGS. 6(A) and 6(B). That is, in a normal mode as shown in FIG. 6(A), it is possible to secure a larger user region 14a in the RAM 14, than in the case of maintenance mode as shown in FIG. 6(B).

Furthermore, it may also be possible to store the program and data of the model-specific database 27 and the maintenance program in a portable type external storage device. In this case, when the external storage device is connected to the external storage connecting member 18, a control member of the external storage device (not illustrated) reads out a maintenance processing program from the external storage device, and expands the program in the RAM 14 to generate the maintenance processing member 25.

Furthermore, if the program and the data of the model-specific database 27 and the maintenance processing program are stored in the external storage device, it may be possible to start the printer in maintenance mode, only when the external storage device is connected to the external storage connecting member 18 upon power-up. With this configuration, a person, other than the maintenance operator who has the external storage device, cannot start up the printer in maintenance mode.

The above embodiments of the present invention are just examples for explaining the present invention, and a scope of the present invention is not limited only to the above embodiments. A person skilled in the art may carry out the present invention in other various modes, without being out of scope of the present invention.

What is claimed is:

1. A printer comprising:
   a print station;
   a control member which controls said print station;
   an operation panel;
   a read-only memory (ROM) which stores a maintenance process program and a model-specific database containing menu information, which is undisclosed to a user, for carrying out a setting of said print station; and
   a random-access memory (RAM) which loads the maintenance process program;
   wherein the model-specific database contains menu information for plural models and a model ID;

wherein the printer is configured such that, when a maintenance mode is selected:
said model-specific database is accessed;
said maintenance process program is loaded into the RAM;
a maintenance process member is provided, which carries out reading of menu information corresponding to a model ID of the print station, and which becomes a menu storage member;
a menu process member displays menu information of the menu storage member and receives an input; and
a control member carries out a setting of said print station in accordance with said received input.

2. A printing system comprising:
a plurality of printers, wherein each of said plurality of printers comprises:
a print station;
a control member which controls said print station;
an operation panel;
a read-only memory (ROM) which stores a model-specific database containing menu information, which is undisclosed to a user, for carrying out a setting of said print station; and
a random-access memory (RAM) which stores a maintenance process program;
wherein said (ROM) stores menu information for print stations of a plurality of models,
wherein said (ROM) of each of said plurality of printers stores common menu information, and
wherein each of said plurality of printers is configured such that, when a maintenance mode is selected:
said model-specific database is accessed;
said maintenance process program is initiated;
a maintenance menu is displayed on said operation panel;
an input to said operation panel is received; and
a setting of said print station is carried out using said received input.

3. A printer according to claim 1, wherein a reboot necessity is set for each maintenance item in said model-specific database.

* * * * *